United States Patent Office 3,133,938
Patented May 19, 1964

3,133,938
INSECTICIDAL LACTONES
Alexander T. Shulgin, Lafayette, Calif., assignor to The Dow Chemical Company, Midland, Mich., a corporation of Delaware
No Drawing. Filed Sept. 4, 1962, Ser. No. 221,321
8 Claims. (Cl. 260—343.6)

This invention is concerned with a new class of chemical compounds and with a process for making them.

These new compounds are lactones of the formula

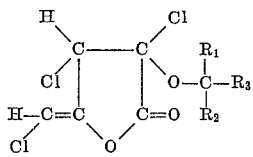

wherein $R_1$ and $R_2$ are hydrogen or lower alkyl of one to about seven carbon atoms and $R_3$ is hydrogen, lower alkyl of one to about seven carbon atoms, lower alkenyl of two to about seven carbon atoms, or vicinal dihalo lower alkyl of two to about seven carbon atoms, the halogen therein being chlorine, bromine, or iodine. Most preferred are the compounds wherein the halogen is bromine and where $R_1$, $R_2$, and $R_3$ together contain a total of not more than about seven carbon atoms. It has been found that these compounds can be made by a process comprising the reaction of tetrachloromuconic acid with a saturated or unsaturated aliphatic alcohol, whereupon the corresponding alkoxy or alkenoxy lactone of the structure above is produced. Dihaloalkyl ethers wherein $R_3$ is dihaloalkyl are made by adding a mole of halogen to the alkenoxy group in the lactone obtained by reaction of an unsaturated alcohol. The reactions involved are illustrated in Examples 4 and 5.

The course of the alcoholysis reaction is particularly surprising and unexpected in the light of the known reaction of tetrachloromuconic acid with water as shown by Karrer et al., Helv. Chim, Acta 32, 1019 (1949). This hydrolysis yields two products, 2,3,5-trichloro-4- oxo-2-pentenoic acid and the γ-lactone of 3,5-dichloro-2,4-dihydroxymuconic acid. Although the alcoholysis which is carried out under similar conditions would be expected to produce analogous results, there takes place not only a decarboxylation but also the addition of an alcohol molecule to a double bond and the major product obtained has an alkoxy-substituted saturated ring structure as shown above.

The alcoholysis reaction is carried out at a temperature of about 50–200° C. by reacting one mole of tetrachloromuconic acid with a mole of alcohol. Ordinarily, excess alcohol is used and the reaction is conveniently run merely by heating a solution of tetrachloromuconic acid in the alcohol of choice at reflux temperature until the reaction is essentially complete. Usually about 0.1–10 hours is sufficient reaction time. The lactone product is then conveniently separated from the reaction solution by crystallization on cooling or by distillation. Inert solvents, for example, hydrocarbons or halohydrocarbons such as benzene, octane, chloroform, chlorobenzene, and the like may be used in carrying out the reaction if desired but are not necessary.

Saturated and unsaturated aliphatic alcohols such as methyl alcohol, ethyl alcohol, isopropyl alcohol, hexyl alcohol, allyl alcohol, methallyl alcohol, and crotyl alcohol are suitable alcohol reactants as well as homologous alcohols of similar structure. Small amounts of water which may be present in the alcohol in amounts up to about 10% by weight have no deleterious effect on the reaction except to lower the yield of product slightly.

The addition of halogen to the alkenoxy group of the γ-lactone of a 2,3,5-trichloro-2-alkenoxy-4-hydroxy-4-pentenoic acid is easily accomplished by methods conventional for such addition to an olefinic double bond, no catalyst being necessary. Contacting the alkenoxy lactone with an equivalent or an excess amount of free halogen at about 0–100° C. ordinarily produces nearly quantitative yields, since the other olefinic double bond in the lactone molecule is relatively inactive. The reaction may be carried out in an inert solvent solution if desired.

EXAMPLE 1

2,3,5-Trichloro-2-Ethoxy-4-Hydroxy-4-Pentenoic Acid, γ-Lactone

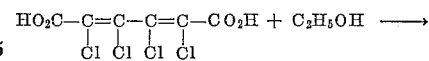

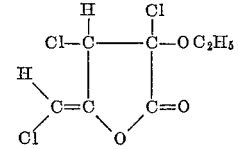

To 60 ml. of boiling anhydrous ethanol there was added 60 grams of tetrachloromuconic acid. The resulting solution was heated at reflux temperature for 25 minutes and then was allowed to cool slowly to room temperature. The white crystalline product which separated from the cooled solution amounted to 18.5 grams and had a melting point of 92–94° C. Recrystallization from methanol raised the melting point to 96–97° C. The product was identified by elemental analysis and by molecular weight determination as 2,3,5-trichloro-2-ethoxy-4-hydroxy-4-pentenoic acid, γ-lactone.

EXAMPLE 2

2,3,5-Trichloro-4-Hydroxy-2-Methoxy-4-Pentenoic Acid, γ-Lactone

By the procedure of Example 1, 25 grams of tetrachloromuconic acid was reacted with excess methyl alcohol. Cooling the reaction solution yielded 3.5 grams of white crystals, M.P. 101–102° C. This product was identified as before as the above-named lactone.

EXAMPLE 3

2,3,5-Trichloro-2-Butoxy-4-Hydroxy-4-Pentenoic Acid, γ-Lactone

Equal weights (10 g.) of tetrachloromuconic acid and n-butyl alcohol were heated on the steam bath for 25 minutes. The resulting solution could not be induced to crystallize and it was fractionally distilled under reduced pressure. The cut boiling at 115–130° C. at 1–2 mm. Hg solidified on standing to form white crystals having a melting point of 45–50° C. The cut amounted to 2.5 g. It was identified as before as the above-named lactone.

EXAMPLE 4

*2,3,5-Trichloro-2-Allyloxy-4-Hydroxy-4-Pentenoic Acid, γ-Lactone*

A solution of 100 g. of tetrachloromuconic acid in excess allyl alcohol was heated at reflux temperature for about 30 minutes. Upon cooling the reaction solution, 15.1 grams of fine white crystals separated, M.P. 85–87° C. The product was identified by elemental analysis and by equivalent weight determination as the lactone named.

EXAMPLE 5

*2,3,5-Trichloro-2-(2,3-Dibromopropoxy)-4-Hydroxy-4-Pentenoic Acid, γ-Lactone*

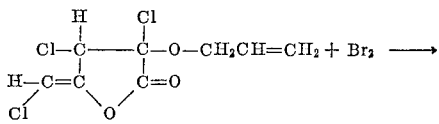

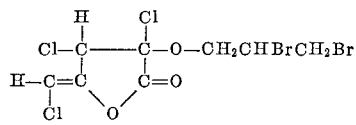

To five grams of the product of Example 4 there was added 50 ml. of liquid bromine and the solution was refluxed for 15 minutes. The excess bromine was then removed with an air stream on the steam bath. The residual oil was kept at 100° C. and blown with air until colorless. The oil crystallized on cooling to yield 5.8 g. of white solid. Recrystallization from aqueous methanol yielded 5.4 g. of fine white crystals, M.P. 78–80° C. The identity of the product was confirmed by elemental analysis as the lactone named.

By the general method illustrated in the foregoing examples, other alkoxy lactones of analogous structure are prepared by alcoholysis of tetrachloromuconic acid. Reaction of this acid with isopropyl alcohol yields the isopropoxy lactone, using hexyl alcohol, the hexyloxy lactone is obtained, from methallyl alcohol the methallyloxy lactone is obtained, and alcoholysis with crotyl alcohol yields the 2-butenyloxy lactone. By addition of free halogen to the lactones obtained by alcoholysis with unsaturated alcohols, the corresponding dihaloalkoxy lactones are produced. For example, addition of chlorine to the allyloxy lactone produces the 2,3-dichloropropoxy lactone, bromine is added to the methallyloxy lactone to make the 2,3-dibromo-2-methylpropoxy lactone, and compounds such as the 2,3-diiodopropoxy and the 2,3-dichlorobutoxy lactones are similarly prepared. Mixed dihalo derivatives may be made by addition of compounds such as BrCl and ICl.

These compounds are useful as the active components in contact insecticides for the control of flies, cockroaches, ticks, and the like. Aqueous dispersions containing as little as 0.05% of some of these compounds have been found to be effective against such pests.

I claim:

1. A compound of the formula

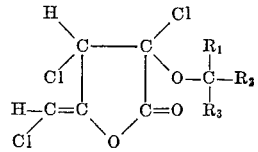

wherein $R_1$ and $R_2$ are selected from the group consisting of hydrogen and lower alkyl and $R_3$ is selected from the group consisting of hydrogen, lower alkyl, lower alkenyl, and vicinal dihalo lower alkyl, the halogen therein having an atomic number from 17 to 53, and with the further condition that $R_1$, $R_2$, and $R_3$ together contain a total of not more than about seven carbon atoms.

2. 2,3,5-trichloro - 2 - methoxy-4-hydroxy-4-pentenoic acid, γ-lactone.

3. 2,3,5-trichloro - 2 - ethoxy-4-hydroxy-4-pentenoic acid, γ-lactone.

4. 2,3,5 - trichloro - 2 - butoxy-4-hydroxy-4-pentenoic acid, γ-lactone.

5. 2,3,5 - trichloro - 2 - allyloxy-4-hydroxy-4-pentenoic acid, γ-lactone.

6. 2,3,5 - trichloro - 2 - (2,3-dibromopropoxy)-4-hydroxy-4-pentenoic acid, γ-lactone.

7. A process for making the compound of claim 1 which comprises reacting by contacting at least one mole of an alcohol selected from the group consisting of an alkanol of one to about eight carbon atoms and an alkenol of three to about eight carbon atoms with one mole of tetrachloromuconic acid at a temperature of about 50° C. to about 200° C. for a time sufficient to effect a substantial amount of reaction, and separating said compound from the reaction mixture thereby obtained.

8. The process of claim 7 wherein the alcohol reactant is an alkenol of three to about eight carbon atoms and wherein the compound thereby produced is reacted by contacting with about one molar equivalent of a halogen having an atomic number from 17 to 53.

No references cited.